(12) United States Patent
Kim et al.

(10) Patent No.: US 7,649,589 B2
(45) Date of Patent: Jan. 19, 2010

(54) LIQUID CRYSTAL DISPLAY MODULE

(75) Inventors: Je Hong Kim, Kyounggi-do (KR); Seong Man Jeon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/742,773

(22) Filed: Dec. 23, 2003

(65) Prior Publication Data

US 2004/0183956 A1     Sep. 23, 2004

(51) Int. Cl.
*G02F 1/1335* (2006.01)
*F21V 7/04* (2006.01)

(52) U.S. Cl. .......................... 349/62; 349/65; 362/617; 362/619

(58) Field of Classification Search ................ 349/58, 349/62, 65, 617, 619; 362/617, 619
See application file for complete search history.

(56) References Cited

U.S. PATENT DOCUMENTS

| | | | |
|---|---|---|---|
| 6,356,330 B1 * | 3/2002 | Ando et al. ................. | 349/141 |
| 6,412,968 B1 * | 7/2002 | Ohkawa ....................... | 362/26 |
| 6,839,100 B1 * | 1/2005 | Saito et al. .................... | 349/58 |
| 6,951,400 B2 * | 10/2005 | Chisholm et al. ............. | 362/29 |
| 2002/0030650 A1 * | 3/2002 | Kawada et al. ................ | 345/87 |
| 2003/0016313 A1 * | 1/2003 | Jeong .......................... | 349/58 |

FOREIGN PATENT DOCUMENTS

| KR | 1020010001777 | 1/2001 |
|---|---|---|
| KR | 1020020010097 | 2/2002 |
| KR | 1020020078489 | 10/2002 |

OTHER PUBLICATIONS

"An LCD Back Light which Keeps Brightness Uniformity", Jan. 1999, IBM Research Disclosure, p. 149.*

* cited by examiner

*Primary Examiner*—David Nelms
*Assistant Examiner*—W. Patty Chen
(74) *Attorney, Agent, or Firm*—McKenna Long & Aldridge LLP (57) ABSTRACT

A liquid crystal display module device includes a light-guide plate, a lamp disposed along one side of the light-guide plate, and a plurality of lamp holders enclosing opposing end portions of the lamps, wherein the lamp holders include transparent material.

17 Claims, 7 Drawing Sheets

LIQUID CRYSTAL DISPLAY MODULE

The present invention claims the benefit of Korean Patent Application No. P2003-17450 filed in Korea on Mar. 20, 2003, which is hereby incorporated by reference.

BACKGROUND OF THE INVENTION

1. Field of the Invention

The present invention relates to a display module, and more particularly, to a liquid crystal display module.

2. Description of the Related Art

In general, liquid crystal display module (LCM) devices display images on a display screen by controlling a transmittance of light produced by a backlight unit. The transmittance is controlled by a liquid crystal panel that has a plurality of liquid crystal cells arranged as a matrix configuration of a plurality of control switches for switching video signals to be supplied to each liquid crystal cell.

Figure 1:
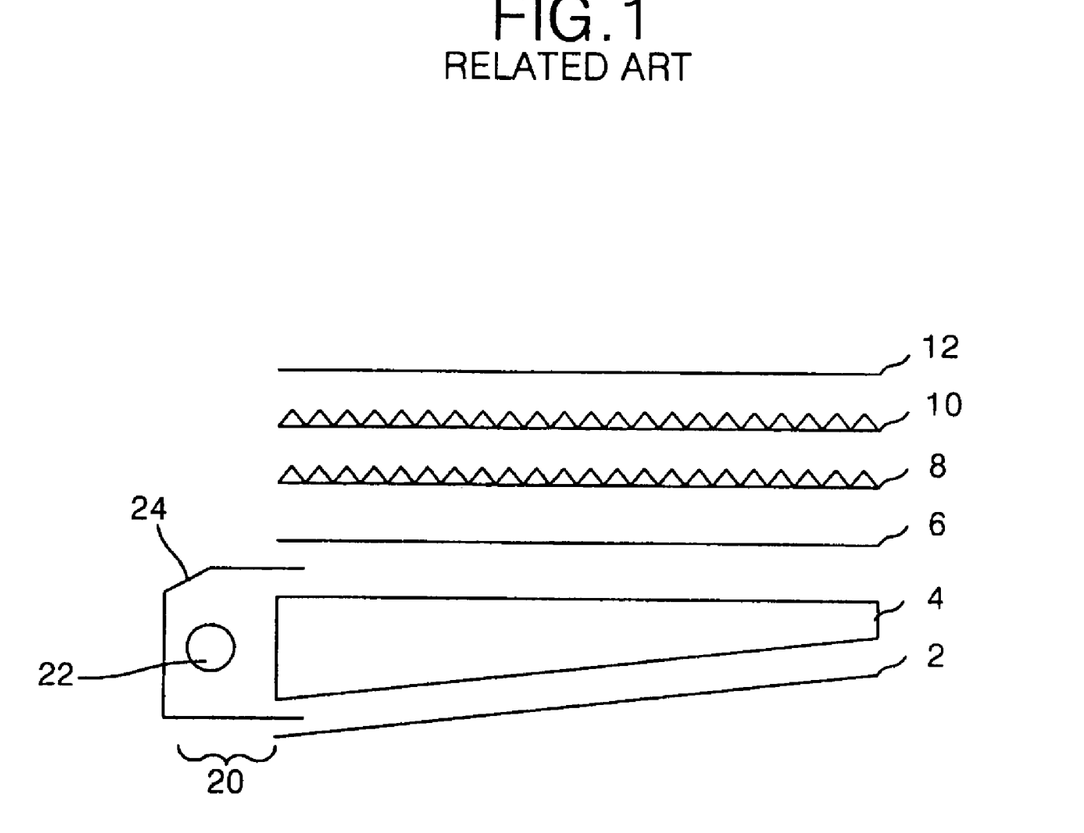
FIG. 1 is a schematic cross section view of a back light unit according to the related art.

FIG. 1 is a schematic cross section view of a back light unit according to the related art. In FIG. 1, a back light unit includes: a light-guide plate 4 for guiding light transmitted through a light incident area 20, a reflection plate 2 placed under the light-guide plate 4 to reflect downward directed light along an upward direction, a first diffusion sheet 6 for diffusing the light transmitted through the light-guide plate 4, first and second prism sheets 8 and 10 for regulating a direction of the light, and a first diffusion sheet 12 for diffusing the light transmitted through the first and second prism sheets 8 and 10.

The light incident area includes a lamp 22 for generating light, and a lamp housing 24 for accommodating the lamp 22 and for reflecting the light from the lamp 22 toward the light-guide plate 4. The lamp 22 includes a cold cathode fluorescent lamp, and is placed along one side of the light-guide plate 4. Accordingly, if the backlight unit is used in a monitor, the lamps 22 are placed along either side of the light-guide plate 4. If the backlight unit is used in a notebook computer, the lamp 22 is placed along one side of the light-guide plate 4.

Figure 2:
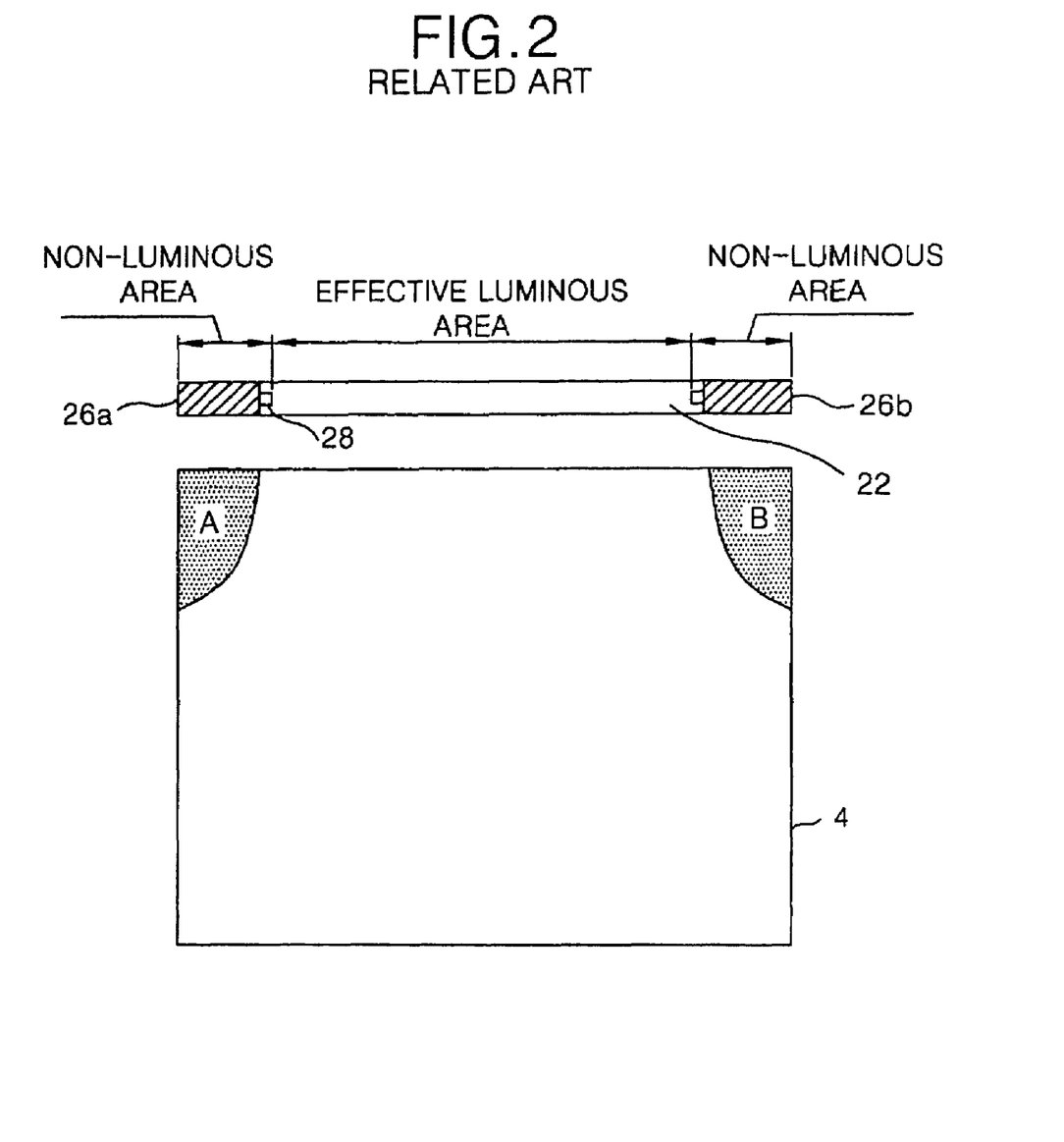
FIG. 2 is a schematic plan view of a lamp and light-guide plate of FIG; 1 according to the related art.

FIG. 2 is a schematic plan view of a lamp and light-guide plate of FIG. 1 according to the related art. In FIG. 2, lamp electrodes 28 of aluminum (Al) are installed at opposing ends of the lamp 22, wherein an external driving power (not shown) is supplied to the lamp electrodes 28. In addition, some portions of both the lamp electrodes 28 and opposite ends of the lamp 22 are enclosed by lamp holders 26a and 26b made of black resin and prevent electrical disconnection of the lamp electrodes 28 caused by external impact. Accordingly, an effective luminous area of the lamp 22 exists between the lamp electrodes 28, and a non-luminous area contains the lamp electrodes 28 and the area that lamp holders 26a and 26b occupy, wherein a length of the non-luminous area is about 7 mm.

In FIG. 1, the light-guide plate 4 is fabricated by an injection molding using a mold frame and scattering patterned printing. The light-guide plate 4 transforms the light incident from the lamp 22 via a light incident surface into a surface light source, and guides the light toward the liquid crystal panel. Moreover, the reflection plate 2 re-reflects the light incident through the rear surface of the light-guide plate 4 toward the light-guide plate 4, and reduces light loss. For example, the reflection plate 2 reflects the light transmitted to the light-guide plate 4 that is directed toward a rear surface of the light-guide plate 4 and reflects the light back through a front surface of the light-guide plate 4.

According to the related art, the light generated by the lamp 22 reaches the light-guide plate 4 through the incident surface present at one side of the light-guide plate 4. The lamp housing 24 having inner reflecting surfaces reflect the light from the lamp 22 toward the incident surface of the light-guide plate 4. In addition, the first diffusion sheet 6 diffuses the light transmitted through the light-guide plate 4 along an entire space of the back light unit. The first and second prism sheets 8 and 10 regulate the direction of the light transmitted through the first diffusion sheet 6, wherein the light transmitted through the first and second prism sheets 8 and 10 is diffused again by the second diffusion sheet 12, and finally reaches the liquid crystal panel.

According to the related art, the length of the effective luminous area of the lamp 22 is shorter than that of the light-guide plate due to the lamp holders 26a and 26b enclosing the ends of the lamp 22. Thus, the light intensity at edge areas A and B of the light-guide plate 4 is reduced, i.e., at corners of the light-guide plate 4 close to the ends of the lamp 22. Therefore, the edge areas A and B of the light-guide plate 4 are darker than other areas of the light-guide plate 4. Thus is commonly known as the edge darkness phenomenon of the light-guide plate 4.

Figure 3:
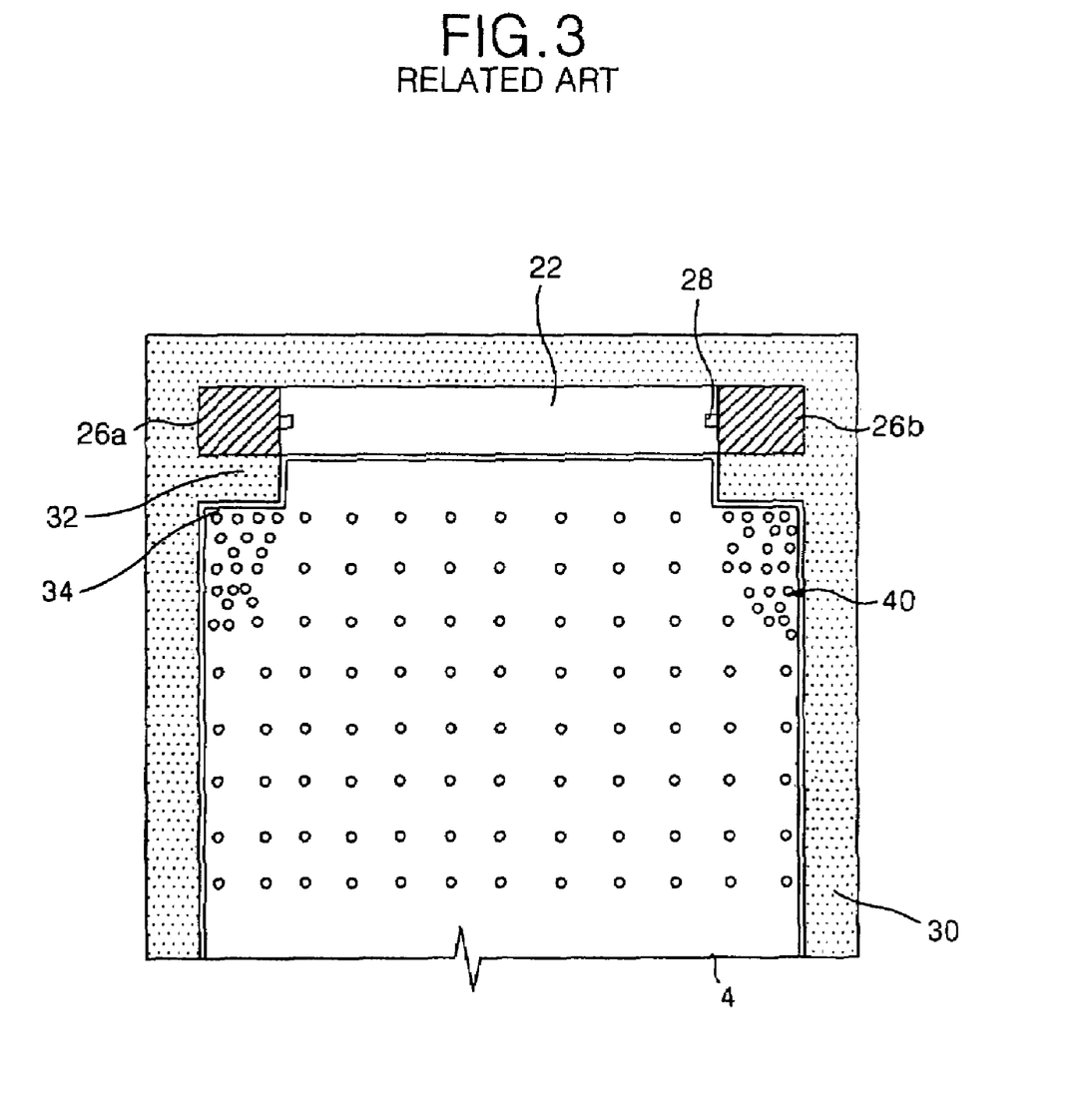
FIG. 3 is a schematic plan view of a lamp and light-guide plate installed on a main support of an LCM according to the related art.

FIG. 3 is a schematic plan view of a lamp and light-guide plate installed on a main support of an LCM according to the related art. In FIG. 3, a main support 30 is provided to support the light-guide plate 4, and dot patterns 40 of scattering material are formed on edge areas of the light-guide plate 4. The main support 30 has a stepped surface for supporting the backlight unit including the lamps 22 and the light-guide plate 4. In addition, a stopper 32 is formed on the stepped surface and projects toward the light-guide plate 4 to prevent direct contact between the side of the light-guide plate 4 and the lamp 22 upon movement of the light-guide plate 4.

The dot patterns 40 formed on the edge area of the light-guide plate 4 increase the amount of light incident to the light-guide plate 4 by making use of the scattering characteristics of light. In addition, a concave stopper home 34 is formed at the edge area of the light-guide plate 4 to have surface contact with the stopper 32 projecting from the main support 30. The stopper home 34 contacts the stopper 32 formed at the main support 30 supporting the light-guide plate 4. Thus, movement of the light-guide plate 4 is prevented by the stopper 32 of the main support 30.

The dot patterns 40 contribute to overcoming the edge darkness phenomenon of the light-guide plate 4. However, the stopper 32 of the main support 30 extinguishes the light path from the lamp 22 to the edge area of the light-guide plate 4. Accordingly, overcoming the edge darkness phenomenon of the light-guide plate 4 is problematic, and additional processes are required to form the dot patterns 40, thereby raising production costs of the LCM device.

SUMMARY OF THE INVENTION

Accordingly, the present invention is directed to a liquid crystal display module device that substantially obviates one or more of the problems due to limitations and disadvantages of the related art.

An object of the present invention is to provide a liquid crystal display module having high brightness within light incident areas of a light-guide plate.

Additional features and advantages of the invention will be set forth in the description which follows, and in part will be apparent from the description, or may be learned by practice of the invention. The objectives and other advantages of the invention will be realized and attained by the structure particularly pointed our in the written description and claims hereof as well as the appended drawings.

To achieve these and other advantages and in accordance with the purpose of the present invention, as embodied and broadly described, a liquid crystal display module device includes a light-guide plate, a lamp disposed along one side of the light-guide plate, and a plurality of lamp holders enclosing opposing end portions of the lamps, wherein the lamp holders include transparent material.

In another aspect, a liquid crystal display module device includes a main support, a light-guide plate on the main support, a stopper projecting from the light-guide plate, a stopper home formed at the main support, the stopper being inserted into the stopper home, a lamp disposed along either side of the light-guide plate, and a lamp holder of transparent material for enclosing opposing end portions of the lamp.

In another aspect, a liquid crystal display module device includes a main support having a pair of stopper homes formed along first and second opposing sides of the main support, a light-guide plate having a pair of stoppers formed along first and second opposing sides of the light-guide plate and inserted within the stopper homes of the main support, a lamp disposed along a third side of the light-guide plate adjacent to the first and second sides of the light-guide plate, and a plurality of transparent lamp holders enclosing opposing end portions of the lamps, wherein the light-guide plate includes a plurality of alternating scattering and refraction patterns formed to extend along the first and second sides of the light guide plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provided a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
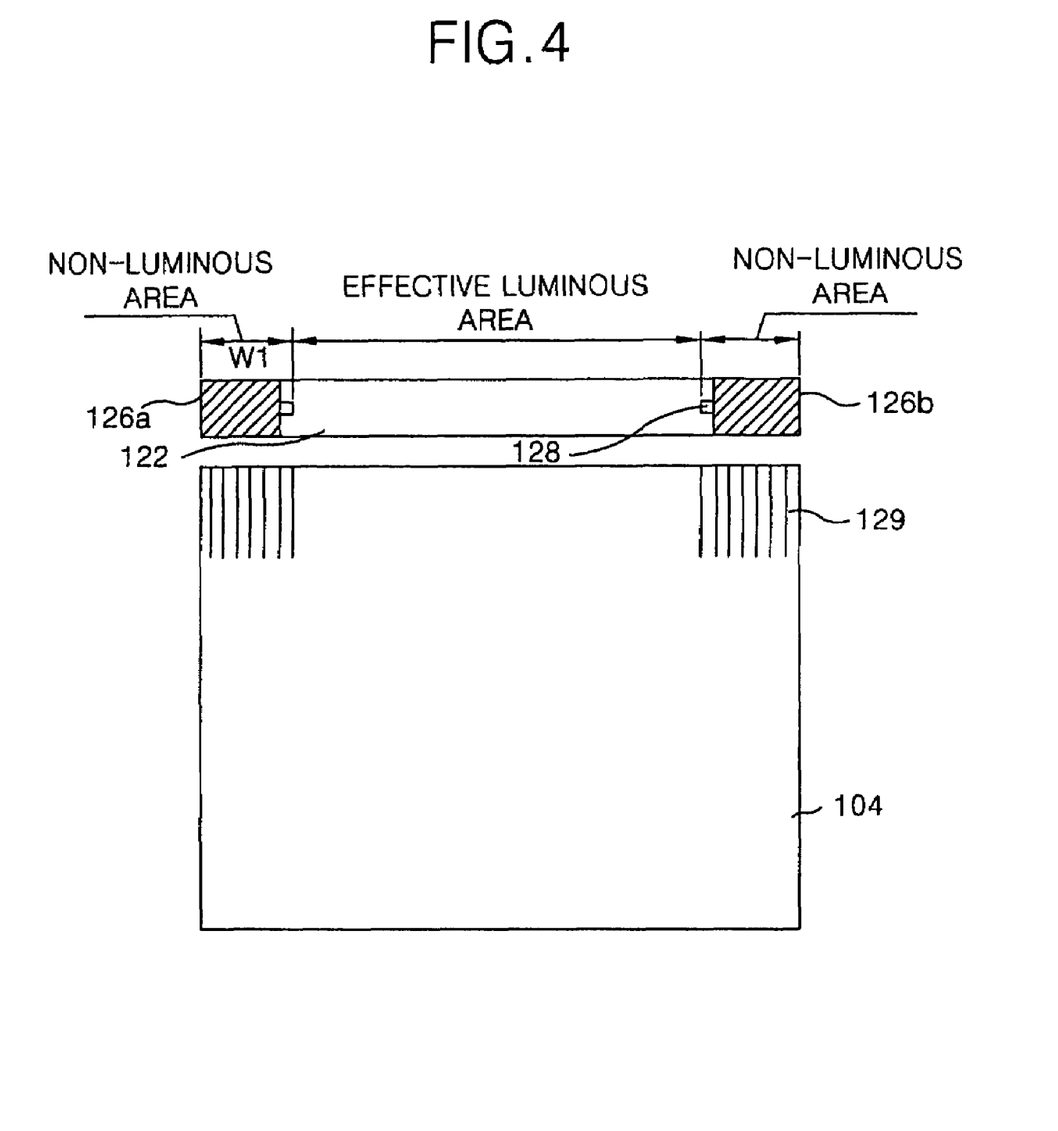
FIG. 4 is a schematic plan view of an exemplary lamp and light-guide plate of an LCM device according to the present invention.

FIG. 4 is a schematic plan view of an exemplary lamp and light-guide plate of an LCM device according to the present invention. In FIG. 4, a liquid crystal display module (LCM) device may include a lamp 122, transparent lamp holders 126a and 126b, and a light-guide plate 104 for transforming light produced by the lamp 122 into a surface light source and for guiding the light toward a liquid crystal display panel.

The lamp 122 may be enclosed by a lamp housing (not shown) that accommodates the lamp 122 and reflects the light produced by the lamp 122 toward the light-guide plate 104. The lamp 122 may include a cold cathode fluorescent lamp and may be placed along a side of the light-guide plate 104. Accordingly, if a backlight unit is used for a monitor, the lamp 122 may be placed along either side of the light-guide plate 104, and if the backlight unit is used for a notebook computer, the lamp 122 may be placed along one side of the light-guide plate 104.

Lamp electrodes 128 may be provided at opposite ends of this lamp 122, wherein an external driving power (not shown) may be supplied to the lamp electrodes 128. Since a length of each lamp electrode 128 may be relatively small, durability of the lamp electrodes 128 against heat generated from the lamp 122 may decrease. Moreover, since the lamp electrode 128 may include at least niobium (Nb), which has a higher melting point (about 2468° C.), niobium electrodes may allow for reduction of the length of the lamp electrodes 128.

Each of the transparent lamp holders 126a and 126b may include a transparent resin, and may enclose the lamp electrodes 128 and opposite end portions of the lamp 22, thereby preventing electrical disconnection of the lamp electrode 128 caused by external impact. For example, the length of each of the transparent lamp holders 126a and 126b may be less than or equal to about 6 mm. Accordingly, the portion of the two lamp electrodes 128 except for the opposite ends of about 1 mm may be covered by the transparent lamp holders 126a and 126b. Thus, since each of the lamp holders 126a and 126b may include the transparent resin instead of a black resin, the lamp holders 126 and 126b may transmit the light produced by the lamp 122 into the edge area of the light-guide plate 104. As shown in FIG. 4, an effective luminous area of the lamp 122 may exist between the lamp electrodes 128, and a non-luminous area of length W1 may contain the lamp electrodes 128 and an area that lamp holders 126a and 126b occupy.

According to the present invention, using lamp electrodes 128 made from niobium decreases the length of the lamp electrodes 128, thereby decreasing the length W1 of the non-luminous area. Consequently, a width of the effective luminous area increases.

The light-guide plate 104 may be fabricated by an injection molding using a mold frame and scattering patterned printing. In addition, the light-guide plate 104 may include scattering patterns 129 formed along edge areas of the light-guide plate 104. For example, the scattering patterns 129 may be disposed along opposite ends of the light-guide plate 104 in close proximity to the lamp 122. Each of the scattering patterns 129 may increase an amount of light incident via the transparent lamp holders 126a and 126b by making use the scattering characteristics of light. The light-guide plate 104 may transform the light incident from the lamp 122 into a surface light source, and guide the light toward the liquid crystal panel. Thus, the intensity of light transmitted from the edge area may be equal to the intensity of light transmitted through the other areas of the light-guide plate due to the scattering patterns 129.

According to the present invention, the LCM-device may further include a reflection plate (not shown) that may be disposed below the light-guide plate 104 to reflect the light transmitted along a rear surface of the light-guide plate 104 and redirect the light toward a front of the light-guide plate 104. Thus, the reflection plate may reduce light loss by re-reflecting the light back through a front surface of the light-guide plate 104.

Table 1 shows experimental results for measuring effects of the edge darkness phenomenon in relation to a length of each of transparent lamp holders 126a and 126b enclosing niobium lamp electrodes 128. Maximum and minimum values for the brightness, and the deviation between the maximum and minimum values are presented by the Table 1.

TABLE 1

| | Length of lamp holder | | | |
| --- | --- | --- | --- | --- |
| | 0 mm | 2 mm | 4 mm | 6 mm |
| Max. brightness | 0.505 | 0.516 | 0.515 | 0.520 |
| Min. brightness | 0.281 | 0.246 | 0.202 | 0.125 |
| deviation | 1.80 | 2.10 | 2.55 | 4.16 |

As shown in Table 1, the deviation between the maximum and the minimum brightness of the light transmitted through the light-guide plate 104 is smallest when the length of each of the lamp holders 126a and 126b is 0 mm. Although the length of each of lamp holders 126a and 126b cannot be made to be 0 mm, by designing the length of each of the lamp holders 126a and 126b to be less than or equal to about 6 mm, the deviation between the maximum and the minimum brightness may be reduced.

According to the present invention, a length of the effective luminous area of the lamp 122 may be increased by using shortened lamp electrodes made from niobium. Accordingly, an increase in the amount of light along the edge areas of the light-guide plate 104 may be achieved by using the lamp holders 126a and 126b made of transparent resin. In addition, by forming scattering patterns 129 along the edge areas of the light-guide plate 104, the LCM device may increase the amount of light within the edge areas to radiate uniform light over an entire region of the light-guide plate 104.

Figure 5:
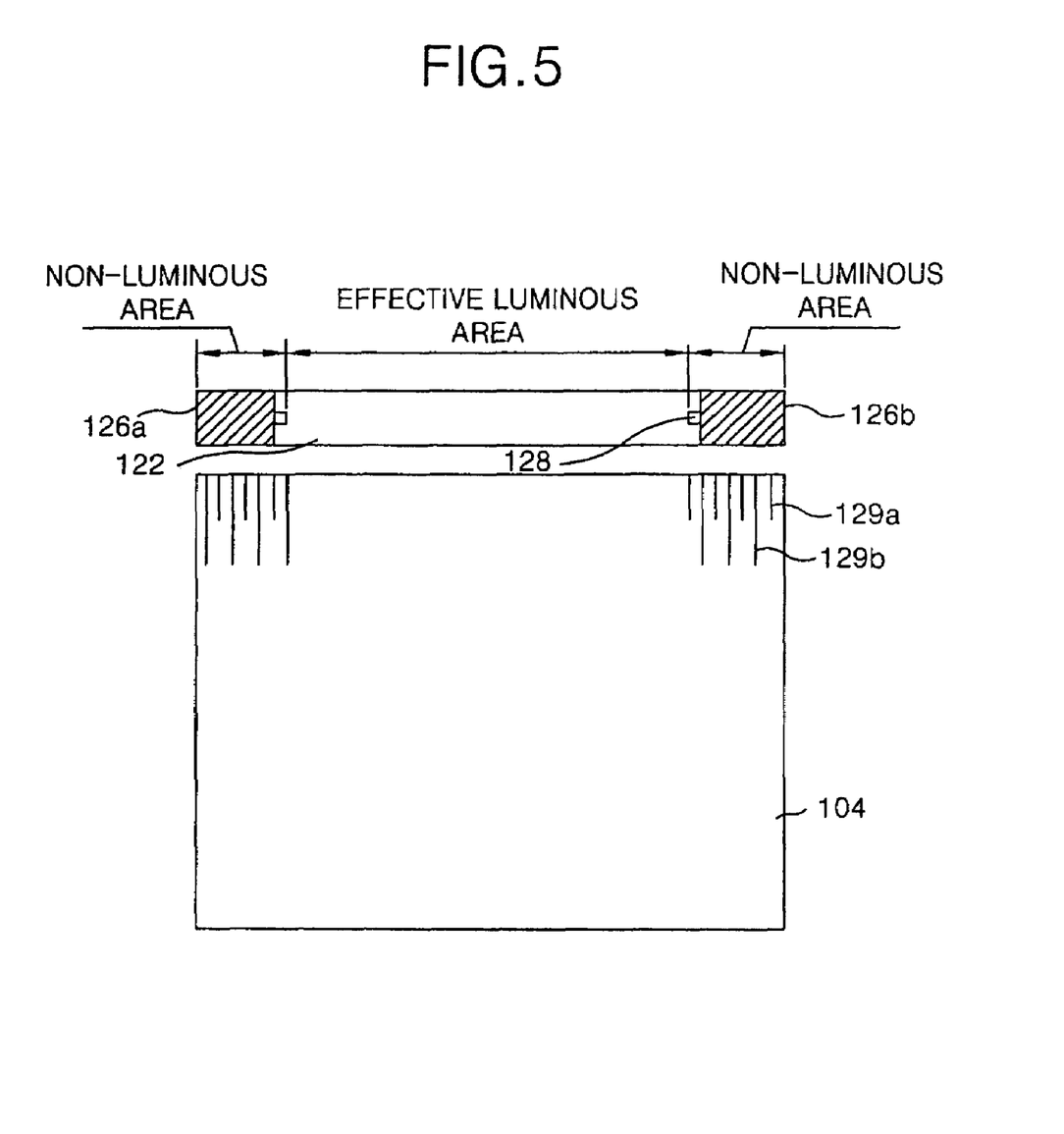
FIG. 5 is a schematic plan view of another exemplary lamp and light-guide plate of an LCM device according to present invention.

FIG. 5 is a schematic plan view of another exemplary lamp and light-guide plate of an LCM device according to present invention. In FIG. 5, an LCM device may include similar components as the LCM device of FIG. 4 except for use of a light-guide plate 104. Accordingly, detailed description of the similar features have been omitted for brevity and only discussion of the light-guide plate 104 have been provided.

In FIG. 5, the light-guide plate 104 may include scattering patterns 129a formed within designated intervals on a front surface of edge areas of the light-guide plate, and refraction patterns 129b formed within gaps between the scattering patterns 129a. Each of the scattering patterns 129a may scatter the light incident to the light-guide plate 104 by making use of the scattering characteristics of light and may guide the scattered light toward the front surface of the light-guide plate 104. Each of the refraction patterns 129b may refract the light incident to the light-guide plate 104 by making use of the refracting characteristics of light and may guide the refracted light toward the front surface of the light-guide plate 104. Each of the scattering patterns 129a and each of the refraction patterns 129b may increase an amount of light along the edge areas to radiate uniform light over an entire region of the light-guide plate 104.

Figure 6:
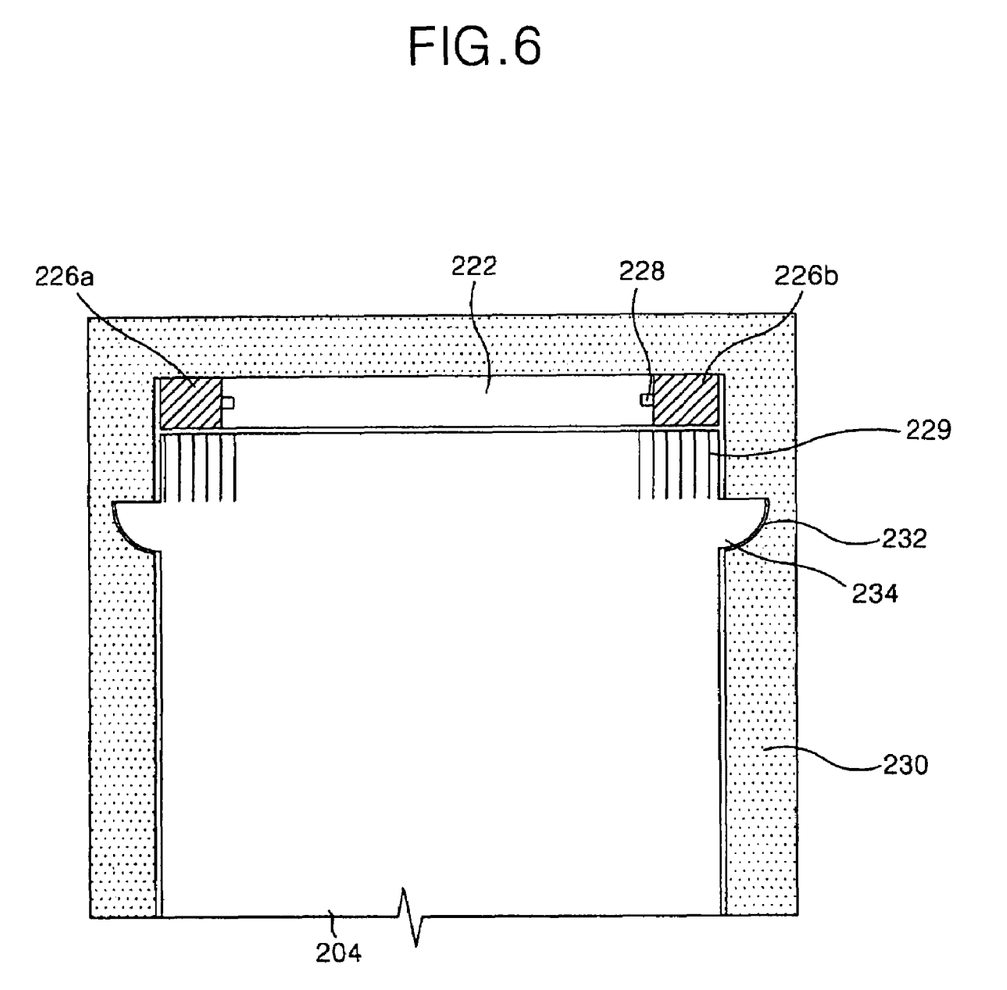
FIG. 6 is a schematic plan view of an exemplary liquid crystal display module device according to the present invention.

FIG. 6 is a schematic plan view of an exemplary liquid crystal display module device according to the present invention. In FIG. 6, a liquid crystal display module may include a main support 230, a stopper home 234 formed along one side of the main support 230, a light-guide plate 204 for transforming light produced by a lamp 222 into a surface light source, a stopper projecting from the light-guide plate 204 and inserted into the stopper home 234, and scattering patterns 229 formed on an edge surface of the light-guide plate 204.

The main support 230 may include a mold and may have a stepped surface to support a backlight unit that includes the lamp 222 and the light-guide plate 204. The stopper home 234 may be formed on the stepped surface of the main support 230 to prevent the light-guide plate 204 from contacting the lamp 222 upon movement of the light-guide plate 204 by fixing the light-guide plate 204. In addition, the scattering patterns 229 may increase an amount of light incident to the light-guide plate 204 by making use of the scattering characteristics of light.

The stoppers 232 may project from either side of the light-guide plate 204 and may have perpendicular and curved surfaces formed to contact the stopper homes 234 formed at the main support 230. Thus, the stoppers 232 may be inserted into the stopper homes 234 formed at the main support 230 in order to prevent movement of the light-guide plate 204. Consequently, the edge areas of the light-guide plate 204 may be enlarged.

The lamp 222 may be a cold cathode fluorescent lamp, and may be placed along one side of the light-guide plate 204, wherein lamp electrodes 228 may be provided at opposing ends of the lamp 222 and an external driving power (not shown) may be supplied to the lamp electrodes 228. For example, as previously described, since the lamp electrode 228 may include niobium (Nb), lengths of each of the lamp electrodes 0.228 may be reduced. In addition, opposing ends of the lamp 222 maybe enclosed by transparent lamp holders 226a and 226b, which may include transparent resin, to prevent electrical disconnection of the lamp electrodes 228 caused by external impact. For example, a length of each of the transparent lamp holders 226a and 226b may be less than or equal to about 6 mm. Accordingly, a length of the niobium lamp electrodes 228 may decrease, thereby decreasing a length of a non-luminous area. Consequently, a width of the effective luminous area of the lamp 222 may increase.

Figure 7:
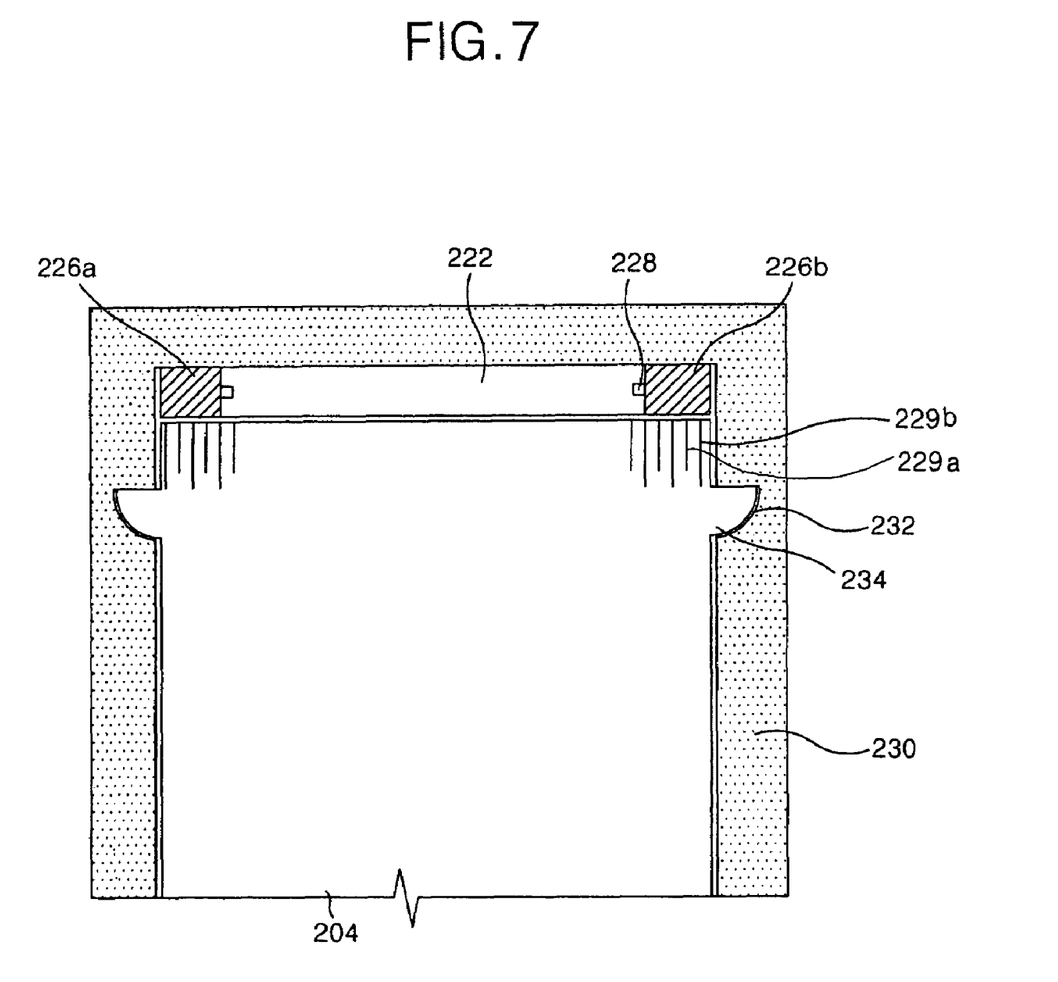
FIG. 7 is a schematic plan view of another exemplary liquid crystal display module device according to the present invention.

FIG. 7 is a schematic plan view of another exemplary liquid crystal display module device according to the present invention. In FIG. 7, an LCM device may include similar components as the LCM device of FIG. 6 including use of scattering patterns 229a formed within designated intervals on a front surface of edge areas of the light-guide plate, and refraction patterns 229b formed within gaps between the scattering patterns 229a. Accordingly, detailed description of the similar features have been omitted for brevity and only discussion of the scattering and refraction patterns 229a and 229b have been provided.

In FIG. 7, a liquid crystal display module may include a main support 230, a stopper home 234 formed along one side of the main support 230, a light-guide plate 204 for transforming light produced by a lamp 222 into a surface light source, a stopper projecting from the light-guide plate 204 and inserted into the stopper home 234, and scattering and refraction patterns 229a and 229b formed on an edge surface of the light-guide plate 204.

The main support 230 may include a mold and may have a stepped surface to support a backlight unit that includes the lamp 222 and the light-guide plate 204. The stopper home 234 may be formed on the stepped surface of the main support 230 to prevent the light-guide plate 204 from contacting the lamp 222 upon movement of the light-guide plate 204 by fixing the light-guide plate 204. In addition, the scattering and refraction patterns 229a and 229b may have first end portions that terminate along an edge portion of the light-guide plate 204 and second end portions that terminate within a region adjacent to a side region of the stopper 234.

The scattering and refraction patterns 229a and 229b may increase an amount of light incident to the light-guide plate 204 by making use of the scattering characteristics of light. For example, refraction patterns 229b may be formed at every gap between the scattering patterns 229a formed on the surface of the edge areas of the light guide plate 204, and may increase an amount of light incident to the light-guide plate 204 may make use of the refracting characteristics of light.

The stoppers 232 may project from either side of the light-guide plate 204 and may have perpendicular and curved surfaces formed to contact the stopper homes 234 formed at the main support 230. Thus, the stoppers 232 may be inserted into the stopper homes 234 formed at the main support 230 in order to prevent movement of the light-guide plate 204. Consequently, the edge areas of the light-guide plate 204 may be enlarged.

The lamp 222 may be a cold cathode fluorescent lamp, and may be placed along one side of the light-guide plate 204, wherein lamp electrodes 228 may be provided at opposing ends of the lamp 222 and an external driving power (not shown) may be supplied to the lamp electrodes 228. For example, as previously described, since the lamp electrode 228 may include niobium (Nb), lengths of each of the lamp electrodes 228 may be reduced. In addition, opposing ends of the lamp 222 may be enclosed by transparent lamp holders 226a and 226b, which may include transparent resin, to prevent electrical disconnection of the lamp electrodes 228 caused by external impact. For example, a length of each of the transparent lamp holders 226a and 226b may be less than or equal to about 6 mm. Accordingly, a length of the niobium lamp electrodes 228 may decrease, thereby decreasing a length of a non-luminous area. Consequently, a width of the effective luminous area of the lamp 222 may increase.

According to the present invention, the stopper homes 234 on the main support 230 may include stopper homes 234 and stoppers 232 may be provided to project from the sides of the light-guide plate 204 to prevent movement of the light-guide plate 204. In addition, the stoppers 232 and the stopper homes 234 may increase an effective light incident area of the light-guide plate 204. Moreover, by forming the scattering and refraction patterns 229a and 229b along the edge areas of the light-guide plate 204 and by using the scattering characteristics of the scattering and refraction patterns 229a and 229b, the amount of light incident to the edge areas of the light-guide plate 204 may be increased. Thus, light distribution across an entire region of light-guide plate 104 may become uniform.

It will be apparent to those skilled in the art that various modifications and variations can be made in the liquid crystal display module device of the present invention without departing from the spirit or scope of the invention. Thus, it is intended that the present invention cover the modifications and variations of this invention provided they come within the scope of the appended claims and their equivalents.

What is claimed is:

1. A liquid crystal display module device, comprising:
   a light-guide plate;
   a lamp disposed along one side of the light-guide plate;
   a stopper projecting from the light-guide plate; and
   a plurality of lamp holders enclosing opposing end portions of the lamps,
   wherein the lamp holders include transparent material;
   wherein the light-guide plate includes scattering patterns formed along incident light portions opposite to the plurality of lamp holders and refraction patterns formed within gaps between the scattering patterns, and
   wherein the scattering patterns and the refraction patterns are substantially perpendicular to the one side of the light-guide plate, formed in parallel and alternating with each other,
   wherein the scattering and refraction patterns have first end portions that terminate at the one side of the light-guide plate,
   wherein the scattering and refraction patterns have second end portions that terminate within a region adjacent to a first end portion of the stoppers.

2. The device according to claim 1, wherein a length of the lamp holders is less than or equal to about 6 mm.

3. The device according to claim 1, wherein the lamp includes electrodes made of niobium (Nb).

4. The device according to claim 1, wherein the scattering patterns and the refraction patterns are substantially parallel with each other.

5. The device according to claim 1, wherein the scattering patterns and the refraction patterns formed on one end of the incident light portions are in parallel with the scattering patterns and the refraction patterns formed on another end of the incident light portions.

6. A liquid crystal display module device, comprising:
   a main support;
   light-guide plate on the main support;
   a stopper projecting from the light-guide plate;
   a stopper home formed at the main support, the stopper being inserted into the stopper home;
   a lamp disposed along either side of the light-guide plate; and
   a lamp holder of transparent material for enclosing opposing end portions of the lamp;
   wherein the light-guide plate includes scattering patterns formed along incident light portions opposite to the plurality of lamp holders and refraction patterns formed within gaps between the scattering patterns, and
   wherein the scattering patterns and the refraction patterns are substantially perpendicular to the one side of the light-guide plate formed in parallel, and alternating with each other,
   wherein the scattering and refraction patterns have first end portions that terminate at the one side of the light-guide plate,
   wherein the scattering and refraction patterns have second end portions that terminate within a region adjacent to a first end portion of the stoppers.

7. The device according to claim 6, wherein a length of the lamp holders is less than or equal to about 6 mm.

8. The device according to claim 6, wherein the lamp includes electrodes made of niobium (Nb).

9. The device according to claim 6, wherein the stopper home includes a first surface perpendicular to edge areas of the main support and a second sloped
   surface that is formed to be concave from the side of the main support.

10. The device according to claim 9, wherein the stopper includes a first surface perpendicular to the edges of the light-guide plat and a second sloped surface that is formed to project from the light-guide plate to be inserted into the stopper home.

11. A liquid crystal display module device, comprising:
    a main support having a pair of stopper homes formed along first and second opposing sides of the main support;

a light-guide plate having a pair of stoppers formed along first and second opposing sides of the light-guide plate and inserted within the stopper homes of the main support;

a lamp disposed along a third side of the light-guide plate adjacent to the first and second sides of the light-guide plate; and a plurality of transparent lamp holders enclosing opposing end portions of the lamps, wherein the light-guide plate includes a plurality of alternating scattering and refraction patterns formed to extend along the first and second sides of the light guide plate, wherein the first and second sides are incident light portions of the light guide plate, and wherein the scattering patterns and the refraction patterns are substantially perpendicular to the one side of the light-guide plate and formed in parallel, wherein the plurality of alternating scattering and refraction patterns have first end portions that terminate at the third side of the light-guide plate, wherein the plurality of alternating scattering and refraction patterns have second end portions that terminate within a region adjacent to a first end portion of the stoppers.

12. The device according to claim 11, wherein a length of the lamp holders is less than or equal to about 6 mm.

13. The device according to claim 11, wherein the lamp includes electrodes made of niobium (Nb).

14. The device according to claim 11, wherein a first group of the plurality of alternating scattering and refraction patterns is disposed adjacent to a first one of the plurality of transparent lamp holders and a second group of the plurality of alternating scattering and refraction patterns is disposed adjacent to a second one of the plurality of transparent lamp holders.

15. A liquid crystal display module device, comprising:

a light-guide plate;

a stopper projecting from the light-guide plate;

a lamp disposed along one side of the light-guide plate; and a plurality of lamp holders enclosing opposing end portions of the lamps, wherein the lamp holders include transparent material;

wherein the light-guide plate includes scattering patterns formed along incident light portions opposite to the plurality of lamp holders and refraction patterns formed within gaps between the scattering patterns, wherein the refraction patterns substantially do refract light, wherein the scattering patterns and the refraction patterns are formed in parallel and alternating with each other, wherein the scattering and refraction patterns have first end portions that terminate at the one side of the light-guide plate, wherein the scattering and refraction patterns have second end portions that terminate within a region adjacent to a first end portion of the stoppers.

16. The device according to claim 15, wherein the scattering patterns substantially do scatter light.

17. The device according to claim 16, wherein the scattering patterns and the refraction patterns are substantially parallel to one another and wherein the scattering patterns and the refraction patterns are substantially parallel with each other.

* * * * *